UNITED STATES PATENT OFFICE.

PER GÖSTA EKSTRÖM, OF HARNÄS, SWEDEN, ASSIGNOR TO AKTIEBOLAGET ETHYL, OF FALUN, SWEDEN.

METHOD OF MANUFACTURING ALCOHOL FROM SULFITE LIQUOR.

1,042,332.  Specification of Letters Patent.  Patented Oct. 22, 1912.

No Drawing.  Application filed February 24, 1912. Serial No. 679,796.

*To all whom it may concern:*

Be it known that I, PER GÖSTA EKSTRÖM, a citizen of the Kingdom of Sweden, residing at Harnäs, Sweden, have invented new and useful Improvements in Methods of Manufacturing Alcohol from Sulfite Liquor from the Sulfite-Pulp Process, of which the following is a specification.

It is well known that the sulfite liquor from the sulfite pulp process contains saccharine matters which by fermentation may be converted into ethyl alcohol. Before such fermentation can be carried out, it is necessary to remove the free sulfurous acid contained in the liquor as it constitutes a poison for the yeast and prevents or retards the fermentation or prevents the complete conversion of the saccharine matters into alcohol. It is well known to bind the free sulfurous acid of the liquor by an addition of quick-lime, lime-stone or limy substances which take up the said sulfurous acid.

I have now found that the sulfite liquor from the sulfite pulp process contains also certain chemical compounds in which sulfurous acid is bound very loosely to lime and organic matters. The sulfurous acid of said compounds will not be neutralized when the liquor in the usual manner is neutralized by means of quick-lime, lime-stone or the like, but remains unchanged in the liquor until the fermentation process begins. During the said process a number of organic acids, especially lactic acid, are formed in the liquor, said acids reacting with the organic compounds in which the sulfurous acid is only loosely bound whereby the latter is freed and then retards the fermentation process. The said compounds are also in unchanged state injurious for the fermentation.

The chief object of the present invention is to avoid the said draw-back by decomposing the said organic compounds in which the sulfurous acid is loosely bound and transferring the sulfurous acid into compounds uninjurious for the yeast before the beginning of the fermentation process.

A further object of the invention is to introduce nitrogen compounds as a nutriment for the yeast performing the fermentation of the saccharine matters in the liquor.

The invention consists, chiefly, in adding to the liquor ammonium sulfate ($[NH_4]_2SO_4$) before the fermentation process begins. On account of its comparatively great dissociation in solution the ammonium sulfate reacts easily with the above-mentioned unstable organic compounds, its negative ions combining with the lime of said compounds into calcium sulfate while the sulfurous acid of said compounds is made free and then neutralized by quick-lime, lime-stone or analogous matters. The chief part of the ammonia evolved in the decomposition of the ammonium sulfate is converted into organic nitrogen compounds such as amids which constitute a better nutriment for the yeast during the fermentation than the ammonium sulfate in its unchanged state. The quantity of ammonium sulfate, of course, should be varied according to the quality of the liquor to be treated. I have obtained good results in using 50 kg. of ammonium sulfate per 100 cu. m. of the sulfite liquor from the usual sulfate pulp process. The ammonium sulfate may be added to the liquor either before, or during, or after the usual neutralizing by quick-lime, lime-stone or the like. In the first-mentioned case the sulfurous acid, freed by the ammonium sulfate, will be dissolved in the liquor and increase its percentage of free sulfurous acid and later on be neutralized, when the liquor in the usual manner is treated with quick-lime, lime-stone or the like. If the ammonium sulfate is added simultaneously with the neutralizing by lime or the like, the sulfurous acid is bound by the lime as it is freed. I prefer, however, to add the ammonium sulfate after the free sulfurous acid has been neutralized in well known manner and the calcium bisulfite and the sulfuric acid contained in the liquor have been converted into unsoluble calcium salts by an addition of lime or the like. The sulfuric acid freed by the ammonium sulfate in this latter case is bound by an excess of lime used during the foregoing neutralizing process or by a further addition of a neutralizing agent such as lime. It is suitable to use lime-stone (calcium carbonate) as a binding agent for the sulfurous acid, inasmuch as it not at all or only slightly reacts with the ammonium sulfate used for the decomposition of the above mentioned organic compounds.

The liquor treated in the above described manner will be more completely fermented than otherwise and gives accordingly a better yield of alcohol than when the usual neutralizing by means of quick-lime, limestone or the like alone is used. The fermented liquid may be distilled in any suitable manner for recovering the alcohol formed therein by the fermentation process.

Having now described my invention, what I claim as new and desire to secure by Letters Patent is:

1. In the manufacture of alcohol of the sulfite liquor from the sulfite pulp process by fermenting the saccharine matters contained therein, the addition of ammonium sulfate to the liquor, substantially as and for the purpose set forth.

2. In the manufacture of alcohol of the sulfite liquor from the sulfite pulp process by fermenting the saccharine matters contained therein and distilling the fermented liquid, the method of converting sulfurous acid bound in the lye in easily decomposable organic compounds into compounds uninjurious for the fermentation, which consists in adding calcium carbonate and ammonium sulfate to the liquor before fermenting the latter, substantially as and for the purpose set forth.

3. Method of manufacturing alcohol of the sulfite liquor from the sulfite pulp process, which consists in neutralizing the free sulfurous acid of the liquor by adding calciferous matters, adding ammonium sulfate to the lye for decomposing organic compounds therein containing sulfurous acid and for increasing the percentage of nitrogenous compounds in the liquor, and then fermenting the liquor, substantially as and for the purpose set forth.

In testimony that I claim the foregoing as my invention, I have signed my name in presence of two subscribing witnesses.

PER GÖSTA EKSTRÖM.

Witnesses:
 CONRAD DELMAR,
 JOHN DELMAR.